Raymond C. Weston
Inventor

By Hall, Pollock & Vande Sande
Attorneys

Raymond C. Weston
Inventor
By Hall, Pollock & Vande Sande
Attorneys

Jan. 12, 1971 R. C. WESTON 3,555,423

MODULATION CONTROL CIRCUITS FOR DELTA-MODULATION TELECOMMUNICATION SYSTEMS

Filed Feb. 6, 1968 4 Sheets-Sheet 3

Raymond C. Weston
Inventor

By Hall, Pollock & Vande Sande
Attorneys

Raymond C. Weston
Inventor
By Hall, Pollock & VandeSande
Attorneys 3,555,423

MODULATION CONTROL CIRCUITS FOR DELTA-MODULATION TELECOMMUNICATION SYSTEMS

Raymond Charles Weston, Christchurch, England, assignor to Minister of Technology in Her Britannic Majesty's Government of the United Kingdom of Great Britain and Northern Ireland, London, England Filed Feb. 6, 1968, Ser. No. 703,418
Claims priority, application Great Britain, Feb. 10, 1967, 6,392/67
Int. Cl. H03k 13/22
U.S. Cl. 325—38 11 Claims

ABSTRACT OF THE DISCLOSURE

A delta-modulation telecommunications system can be made to carry signals of wider dynamic range by pulse-duration modulating feedback signals in the transmitter circuit and received signals in the receiver circuit. The modulation should vary with the amount of information carried or inversely with the frequency of reversals in the delta-modulated signal. A modulation control signal may be derived by a circuit comprising a two-stage shift register, three gates, and an R-C integrating network. Several pulse-duration modulating arrangements are described. These improvements can be incorporated in a compact form, using integrated circuits.

The present invention relates to delta-modulation telecommunication systems wherein the delta-modulator feedback signal is modulated by a control signal which is dependent on the amount of information being transmitted. In one known system of this kind the control signal is derived from the number of signal reversals in a sample of several consecutive output signals, and the delta-modulator feedback signal is amplitude-modulated by the control signal. This arrangement increases the range of amplitudes of signals which can be satisfactorily transmitted by the system, since in effect it varies the sensitivity of the delta-modulator in accordance with the amplitude of the signal applied to it. However the use of amplitude modulation places a limitation on the improvement achieved, and entails the use of circuits capable of linear operation over a wide range of signal amplitudes in applications where a system is required to transmit signals having a wide dynamic range.

According to the present invention a transmitter circuit for a delta-modulation telecommunications system includes a delta-modulator having a feedback line, control means for deriving from the output of the delta-modulator a control signal dependent on the amount of information in a sample of consecutive delta-modulated signals developed thereon, a feedback-signal modulator connected in the feedback line and arranged to chop signals in the feedback line variably in a manner controller by the control signal so that the total duration of each pulse or group of pulses varies as the amount of information in the said sample of consecutive delta-modulated signals, and means for integrating these pulses at the input to the delta-modulator; and a receiver circuit for the system includes control means for deriving a control signal dependent on the amount of information in a sample of consecutive delta-modulated incoming signals, a modulator controlled by the control means and arranged to chop the incoming signals into shorter pulses or groups of pulses so that the duration of each pulse or the total duration of the pulses in each group of pulses is varied in response to variations of the control signal, and an integrating and smoothing filter connected to the output of the modulator.

In the transmitter circuit and also in the receiver circuit the control signal may be an analogue signal of amplitude dependent on the average rate of occurrence of signal-changes in the binary signal transmitted or received.

The use of pulse-duration modulation rather than amplitude modulation in delta-modulation encoders and decoders allows a greater increase in the range of signal amplitudes which can be satisfactorily transmitted and received. Moreover, it allows the amplitudes of the signals within the pulse modulators to be kept within a limited range of amplitudes, even when the delta-modulation system of which it forms a part is transmitting and receiving signals of wider dynamic range than any which could be satisfactorily transmitted or received by previously known delta-modulation systems. This leads to considerable practical advantages, because it enables the pulse modulators to be largely or wholly constructed of miniature integrated-circuit elements of various types used in digital computers. Such elements are comparatively inexpensive, reliable, and of small physical size. Moreover, their use reduces the amount of work involved in assembling and interconnecting the components to form the modulator, thereby saving expense and also reducing the chance of incorrect or defective assembly.

Embodiments of the invention will now be described, by way of example only, with reference to the accompanying drawings, of which:

Figure 1:
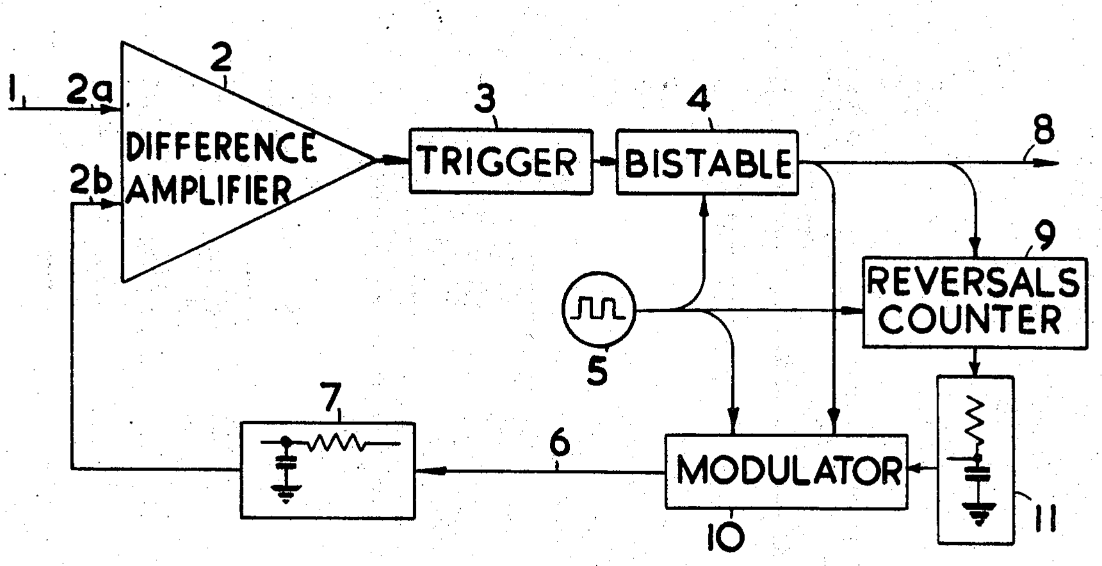
FIG. 1 is a schematic diagram of a telecommunications transmitter.
Figure 3:
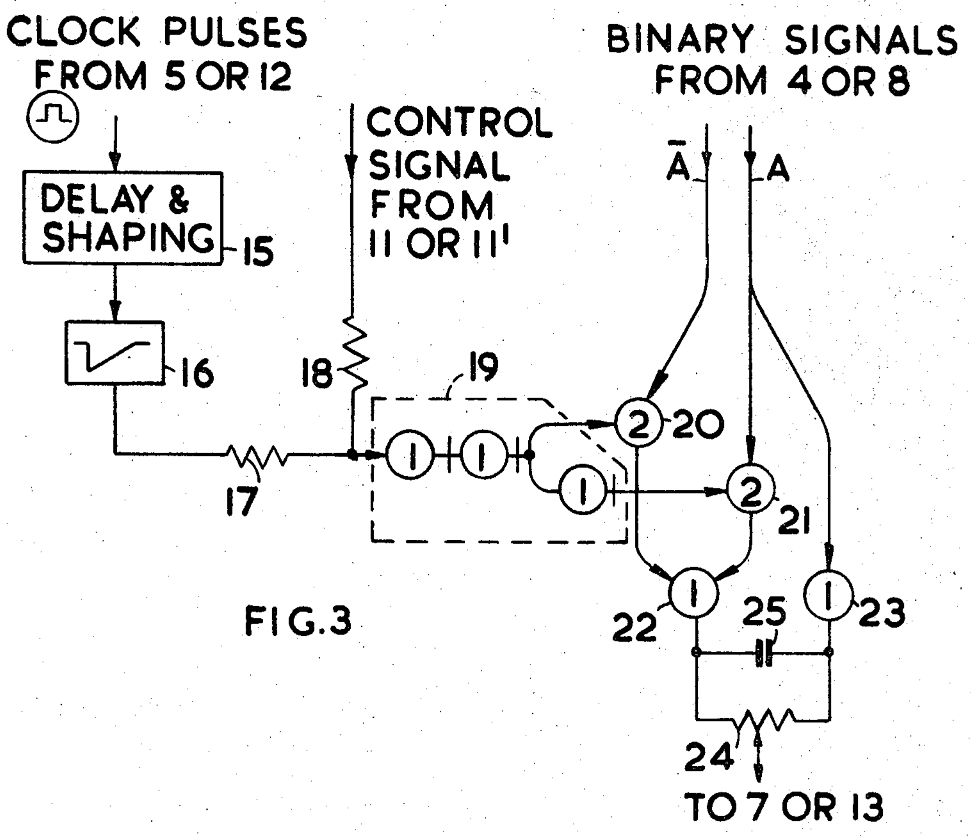
Figure 2:
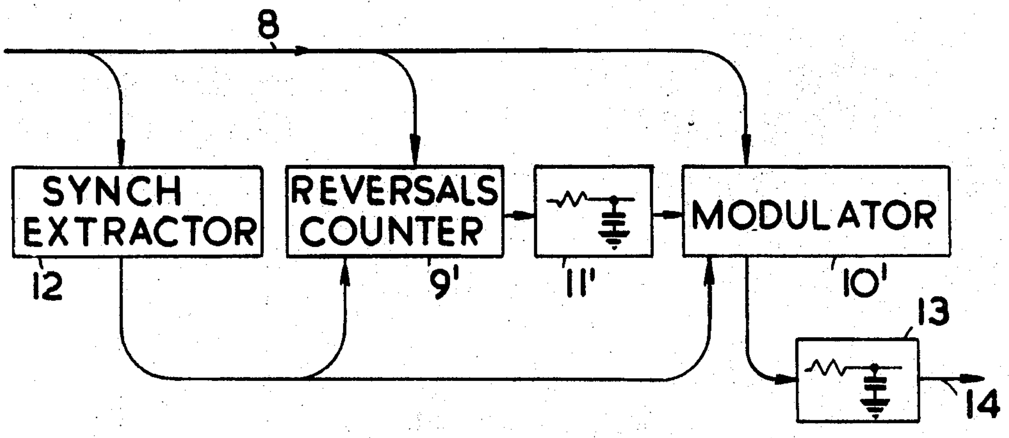
FIG. 2 is a schematic diagram of a telecommunications receiver.
Figure 4:
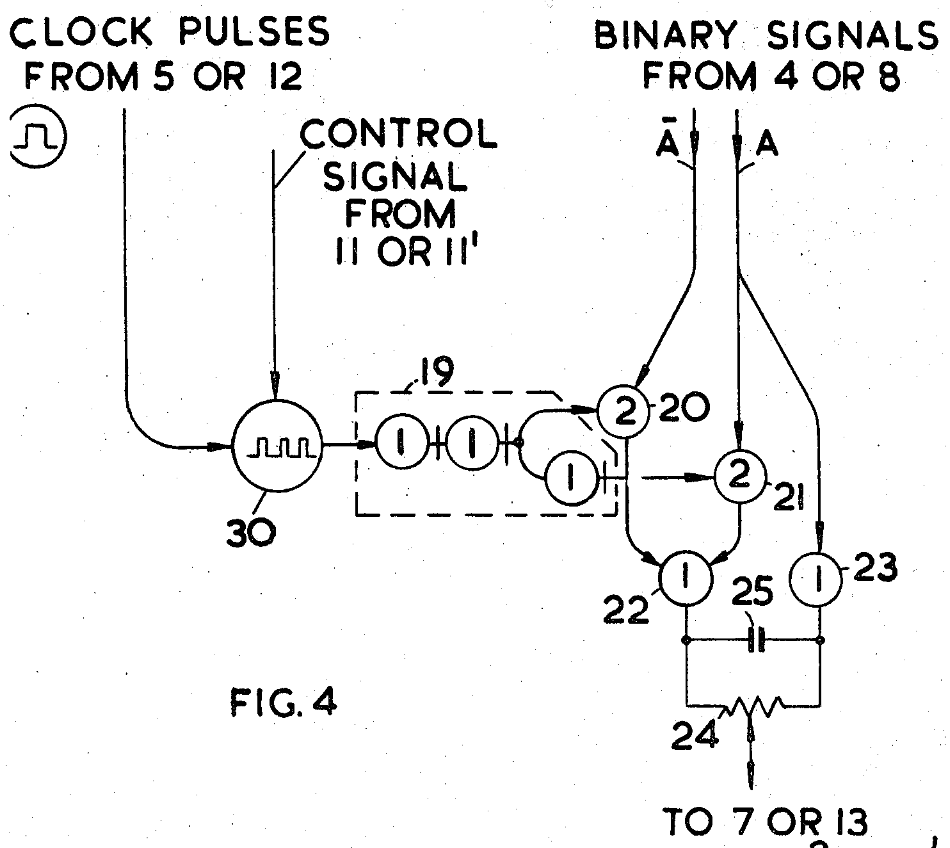
Figure 5:
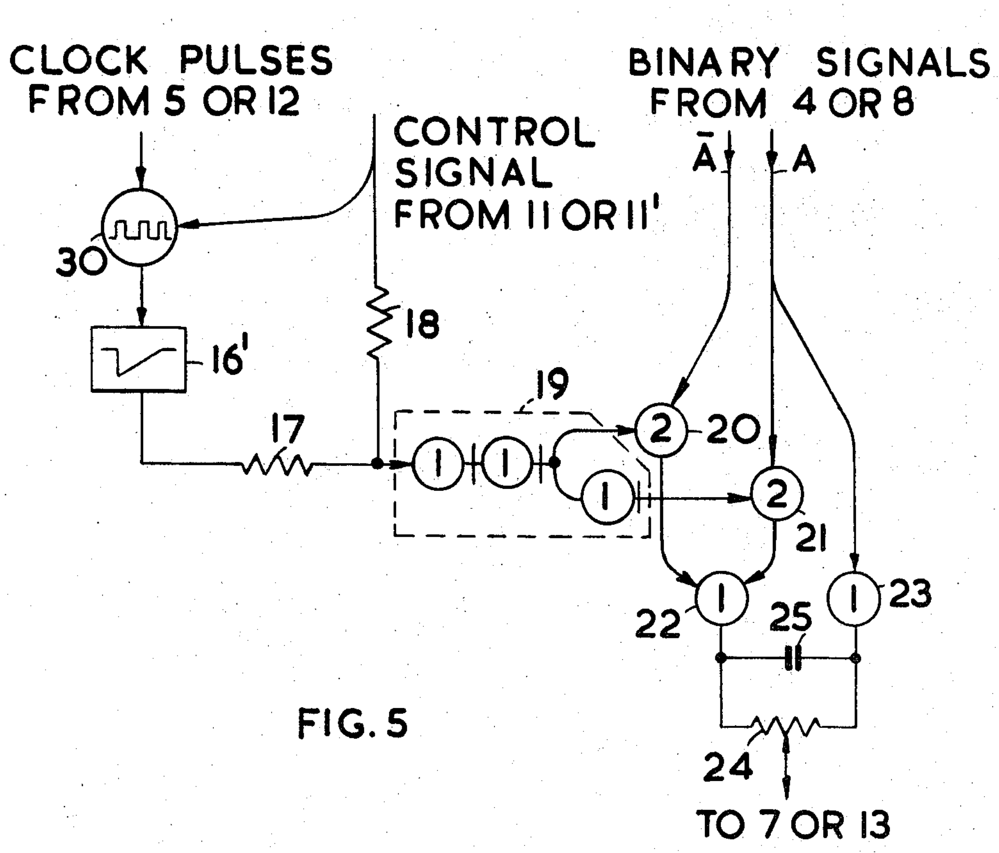
Figure 6:
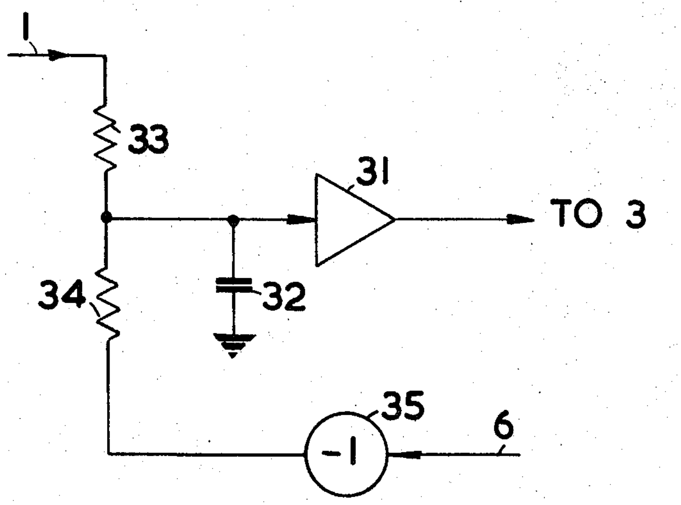
Figure 7:
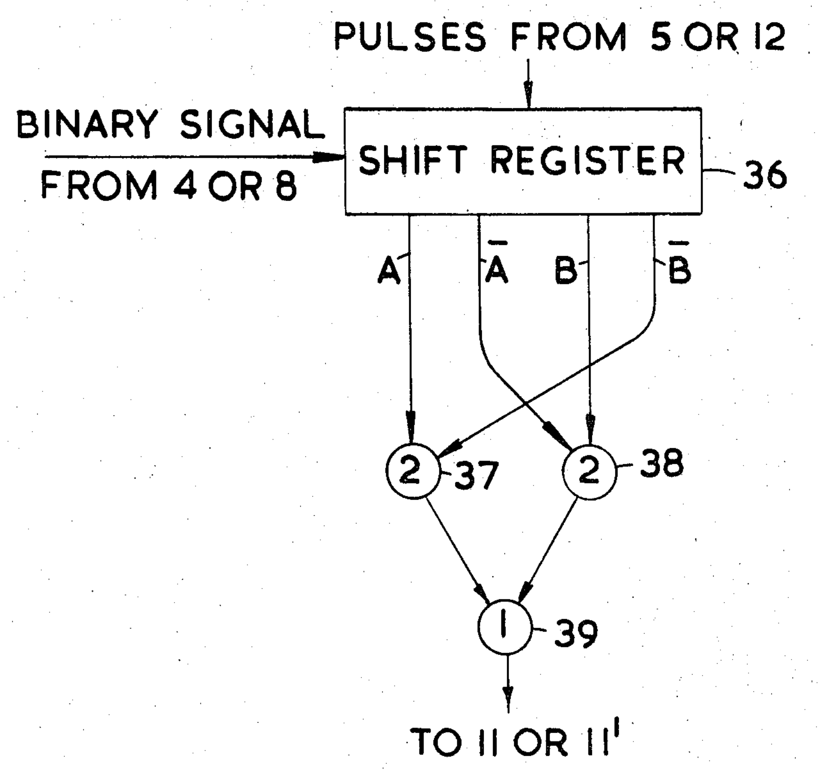

FIG. 3 is a schematic diagram of a modulator used in the transmitter of FIG. 1 and also in the receiver of FIG. 3, FIGS. 4 and 5 are schematic diagrams of alternative forms of pulse modulator, either of which may be used in transmitters such as that of FIG. 1 or in receivers such as that of FIG. 2, FIG. 6 is a schematic diagram of an alternative modified form for a part of the transmitter of FIG. 1, and FIG. 7 is a schematic diagram of a reversals counter circuit used in the transmitter of FIG. 1 and in the receiver of FIG. 2.

Identical or similar components are given identical or similar references wherever they appear in the drawings.

FIG. 1 shows a transmitter wherein an audio input line is connected to a first input 2*a* of a difference amplifier 2. A trigger circuit 3 is connected to receive the output of the amplifier 2 and to drive a bistable circuit 4. A signal generator 5 is arranged to provide square wave reference signals, which will hereinafter be referred to as the clock pulses, to the bistable circuit 4. The output of the bistable circuit 4 is connected through a feedback line 6 and an integrating circuit 7 to a second input 26 of the difference amplifier 2. The parts 1 to 7 inclusive together constitute a delta-modulator circuit. The output of the bistable circuit 4 is also connected to the sending end of a telecommunication transmission channel 8 and to a reversals counter circuit 9. A modulator 10 is connected in series with the feedback line 6. The output of the reversals counter circuit 9 is applied to an integrating circuit 11, and the output of the integrating circuit 11 is connected to a control input of the modulator. The clock pulse output of the generator 5 is also connected to the reversals counter circuit 9 and the modulator 10.

When the transmitter of FIG. 1 is operating, it produces a stream of binary digit-signals at the output of the bistable circuit 4. These binary digit-signals are applied through the feedback line 6 to the integrating circuit 7. The output of the integrating circuit 7 is a stepped feedback signal which approximates to whatever audio signal is applied to the audio input line 1. A digit-signal is provided by the bistable circuit 4 whenever it receives a pulse from the clock pulse generator 5. When the voltage of the audio input signal on the input 2*a* is greater than the voltage of the integrated feedback signal on the input 2*b*, the digit-signal generated is of positive polarity; conversely when the integrated feedback signal is the greater, the digit-signal generated is of negative polarity relative to the mean voltage on the output line 8. When the voltage on the input 2*a* is constant, representing a silence, the output signals of the bistable circuit 4 are alternatively positive and negative digit-signals, and the number of voltage reversals in any sample sequence of these output signals is a maximum. An increasing voltage on the input 2*a* tends to make several consecutive digit-signals positive. A decreasing voltage on the input 2*a* tends to make several consecutive digit-signals negative. Hence variations of the audio input signal on the input 2*a* tend to reduce the number of voltage reversals in any sample sequence of the output signals, and the number of voltage reversals in a sample sequence of the output signals is inversely related to the average slope of the audio input signal and to the amount of information transmitted. When the audio input signal changes very rapidly, long sequences of consecutive digit-signals of the same polarity are produced and details of the audio input signal are lost; the transmitter may be considered overloaded when the losses become serious. The dynamic range of a simple delta-modulator system is limited. On the one hand, signals of less than a certain minimum slope will not significantly alter the sequence of alternately positive and negative digit-signals which represents a silence, and will not therefore be transmitted. On the other hand, signals of greater than a certain maximum slope will lead to a sequence of digit-signals of the sample polarity, which will tend to be reproduced at the receiver as a simple signal of maximum slope; detail variations and peaks of the signal will be lost. These effects are known and have been fully described, for instance in an article by Schouten, de Jager and Greefkes in volume 13, No. 9 of Philips Technical Review, pp. 237–245, March 1952.

The modulator 10 acts as a variable-gain element in the feedback line 6, and has the effect of varying the incremental height of the steps on the integrated feedback signal in accordance with a control signal. The control signal is derived from the number of voltage reversals in a sample sequence of the output signals from the bistable circuit 4. As hereinbefore mentioned, the number of reversals in a sample sequence is inversely related to the slope of the input signal, and it is arranged that the effective gain provided by the modulator 10 is increased when the number of reversals decreases, and is decreased when the number of reversals increases.

The use of a modulator which simply modulates the height of the digit-signals in the feedback line 6 makes the dynamic range of the transmitter greater than that of a simple delta-modulator, but a further improvement is desirable. To achieve the maximum dynamic range with a transmitter using a simple height-modulating modulator, some comparatively small digit-signals and some comparatively large digit-signals must be used, and the modulator circuits must be capable of operating over a large dynamic range without excessive non-linearity. The dynamic range of the transmitter is limited by the linear range of the modulator circuits.

The present invention relates to improved systems which involve the use of alternative types of modulator, controlling the duration of pulses representing digit-signals in the feedback line 6 as will be described hereinafter. In these improved systems the modulator circuits do not have to operate over a wide range of signal amplitudes, and their dynamic range does not limit the dynamic range of the system as a whole. Moreover, simpler and less expensive modulator circuits may be used because they are only required to operate with signal amplitudes within a restricted dynamic range.

FIG. 2 shows a telecommunications receiver wherein the receiving end of a telecommunication channel 8 is connected to inputs of a synchronisation extractor 12, a reversals counter circuit 9′ and a modulator 10′. An output of the synchronisation extractor 12 is connected to the reversals counter circuit 9′ and to the modulator 10′. The output of the reversals counter 9′ is applied to an integrating circuit 11′, and the output of the integrating circuit 11′ is connected to a control input of the modulator 10′. The output of the modulator 10′ is connected through an integrating and smoothing filter circuit 13 to an audio output line 14.

It should be clearly understood that the integrating circuit 7 and 11 of FIG. 1, and 11′ and 13 of FIG. 2, are simple resistance-capacitance networks and are not mathematically perfect integrators. Mathematically perfect integrations would be neither practical nor useful in delta-modulation systems of the sort herein described.

In the receiver of FIG. 2, the synchronisation extractor 12 produces reference signals synchronised with the digit-signals of a signal received from the channel 8. There reference signals are used to synchronise the actions of the reversals counter 9′ and the modulator 10′. The reversals counter 9′ produces a signal related to the number of voltage reversals in a sample sequence of consecutive digit-signals from the channel 8, and this signal is integrated by the circuit 11′ to provide a control signal which corresponds to the control signal applied to the control input of the modulator 10 in the transmitter of FIG. 1. The modulator 10′ is arranged to act as a variable-gain element providing an effective gain which is inversely related to the number of reversals in each sample sequence of the received digit-signals, so that it will effectively restore the dynamic range of the transmitted signal to approximately its original value. The integrating and smoothing filter circuit 13 averages the output pulses from the modulator to produce an approximation to the audio input signal originally applied to the transmitter.

FIG. 3 shows a modulator for applying to the feedback line 6 one pulse of controllable duration for each digit-signal emitted by the bistable circuit 4. The modulator includes a delay and pulse shaping unit 15 which is arranged to receive pulses either from the clock pulse generator 5 in the transmitter of FIG. 1 or from the synchronisation extractor 12 in the receiver of FIG. 2. The pulse shaping unit 15 is arranged to trigger a ramp signal generator 16. A summing arrangement in the form of two resistors 17 and 18 is connected to the input of a threshold and buffer amplifier unit 19. The resistor 17 is connected to the output of the ramp signal generator 16, and the resistor 18 is connected to receive the control signal from either the integrating circuit 11 of the transmitter of FIG. 1 or the integrating circuit 11′ of the receiver of FIG. 2.

The amplifier 19 is arranged to apply complementary output signals to inputs of two and-gates 20 and 21. Outputs of the and-gates 20 and 21 are connected to inputs of an or-gates 22. Binary signals derived from the channel 8 (FIG. 2) or directly from the bistable circuit 4 (FIG. 1) are applied to the modulator of FIG. 3 in a direct form A and in an inverted form $\overline{A}$. The direct form A of the binary signals is applied to inputs of the and-gate 21 and an or-gate 23, while the inverted form $\overline{A}$ is applied to an input of the and-gate 20. A potentiometer 24 and a capacitor 25 are connected in parallel across the outputs of the or-gates 22 and 23. The arm of the potentiometer 24 is connected either to the integrating circuit 7 of the transmitter of FIG. 1 (through the feedback line 6) or to the integrating circuit 13 of the receiver of FIG. 2.

The ramp function generator 16 is arranged to produce one voltage sweep for each binary signal. The control signal received from the integrating circuit 11 or 11′ may be regarded as a variable direct voltage. The input to the amplifier 19 varies in voltage as the sum of the ramp voltage sweep and the variable direct voltage control signal. The input stage of the amplifier 19 is arranged to have a threshold effect, so that it only produces an output when its input voltage is more negative than a given threshold voltage. The resulting output from the final stage of the amplifier 19 is a stream of short positive-going pulses whenever reversals are frequent and the control signal voltage is accordingly high, and a stream of longer pulses whenever reversals are less frequent and the control signal voltage is lower. Each pulse opens the gate 21 so that it delivers the polarity of the simultaneously occurring binary signal A to the or-gate 22 for the duration of the pulses. A complementary output obtained from the penultimates stage of the simplifier 19 opens the gate 20, so that it delivers the polarity of the inverted binary signal $\overline{A}$ to the or-gate 22, for the remainder of the time before the beginning of the next sweep of the ramp voltage. Hence the output of the or-gate 22 is a width-modulated version of the binary signals. This is applied to one end of the potentiometer 24, whose other end is continuously connected to receive the binary signal A. The potentiometer 24 is used as a preset balancing control. The width-modulated pulse signals are taken from the potentiometer 24 and integrated, either in the circuit 7 of FIG. 1 to form an audio-frequency feedback signal or in the circuit 13 of FIG. 2 to form a reproduction of the original audio input signal.

FIG. 4 shows an alternative form of modulator wherein a pulse generator 30 is used in place of the ramp function generator 16 and resistors 17 and 18 of FIG. 3. The pulse generator 30 is arranged to produce pulses of a given amplitude and duration, but with a repetition rate which is inversely related to the voltage of the control signal obtained from the integrating circuit 11 of FIG. 1 or 11′ of FIG. 2. Parts 19 to 24 inclusive are provided as in the modulator of FIG. 3.

The repetition rate of the pulse generator 30 is controlled by the control signal so that when the control signal is almost at its maximum voltage, only one pulse is produced during each bit period, but when the control signal is almost at its minimum voltage, the interval between consecutive pulses is much shorter than the duration of a pulse and the total duration of the pulses is not much less than the duration of the bit period. The pulses control the gates 20 and 21 and thereby in effect cause them to deliver a duration-modulated version of the binary signals to the integrating circuit 7 or 13.

Another alternative form of modulator, which involves a combination of the arrangements of FIGS. 3 and 4, is shown in FIG. 5. In this embodiment, a pulse generator 30 arranged to produce pulses with a repetition rate controlled by the control signal is connected to trigger a ramp signal generator 16′. A summing arrangement in the form of resistors 17 and 18 is connected to the input of a threshold circuit 19 which also acts as a buffer amplifier. The resistor 17 is connected to the output of the ramp signal generator 16′, and the resistor 18 is connected to receive the control signal. Parts 20 to 24 inclusive are provided as in the modulator of FIGS. 3 and 4.

The number of pulses produced in each bit period by the pulse generator 30 is arranged to increase from unity as the voltage of the control signal decreases from its maximum value. The ramp signal generator 176′ produces more-rapidly rising ramp signals than those of the ramp signal generator 16. It is arranged that the minimum interval between the leading edges of consecutive pulses in the output of the pulse generator 30 is just a little longer than the duration of one ramp of the ramp signal from the generator 16′. The threshold circuit and amplifier 19 is arranged to produce one pair of complementary output pulses in response to each ramp of the ramp signal, and the co-operative effect of its threshold action and the superimposed ramp signal is to modulate the durations of its output pulses as in the modulator of FIG. 3. One ramp is generated for each pulse produced by the pulse generator 30. The parts 20 to 24 inclusive operate as in the modulators of FIG. 3 and FIG. 4, with the result that the polarity of the binary signal is transmitted to the integrating circuit 7 (FIG. 1) or 13 (FIG. 2) during a series of pulses. The number of pulses in each bit period and also the duration of each pulse are both increased as the control signal voltage decreases when the number of voltage reversals in a sample sequence of the binary signals decreases.

The action of the modulators of FIGS. 3, 4 and 5 automatically keeps the signal amplitudes in their circuits within a chosen narrow range. This leads to considerable practical advantages as hereinbefore stated because it enables the modulator circuits to be largely or wholly constructed of miniature integrated-circuit elements of various types used in digital computers. The threshold circuit and buffer amplifier 19 in the modulators of FIGS. 3, 4 and 5 in fact comprises three non-elements connected in series, the first element being suitably biassed to achieve the required threshold action.

Whereas the embodiments hereinbefore described have been described as applied to a basically simple delta-modulation system, it should be clearly understood that the present invention is not limited to such applications, and may in fact usefully be applied to other forms of delta-modulator. For example, it may be applied to the type of delta-modulator which has been called a delta-sigma-modulator. This is distinguished in that it effectively integrates the input audio signal before it is coded. It may be realized simply by putting an integrating circuit (not shown) in series with the audio input line 1 of FIG. 1. An alternative form of delta-sigma-modulator may be made using the arrangement of FIG. 6 in place of the difference amplifier 2 and the integrating circuit 7 of FIG. 1.

FIG. 6 shows an amplifier 31 whose input is connected by a capacity 32 to ground, by a resistor 33 to the audio input line 1, and by a resistor 34 in series with an inverter 35 to the feedback line 6. The output of the amplifier 31 is connected to a trigger circuit 3 (not shown in FIG. 6; parts 3, 4, 5, 6, 8, 9, 10 and 11 are in fact provided and arranged as in FIG. 1, and the modulator 10 may be as hereinbefore described with reference to any one of the FIGS. 3, 4 or 5).

In this arrangement, the feedback signals are inverted and then added to the audio input signal. The inversion and subsequent addition are equivalent to the differencing action of the amplifier 2 of FIG. 1. The addition is performed by the action of the resistors 33 and 34. The capacitor 32 co-operates with the resistor 34 to perform the function of the integrating circuit 7 of FIG. 1, and simultaneously co-operates with the resistor 33 to provide the additional integrating action needed to turn the arrangement of FIG. 1 into a delta-modulator.

FIG. 7 shows a practical form of reversals counter which may be used as the reversals counter 9 of FIG. 1 and as the reversals counter 9′ of FIG. 2. A two-stage shift register 36 is arranged to receive and store binary signals either from the channel 8 (FIG. 2) or directly from the bistable circuit 4 (FIG. 1), and has a shift control input connected to receive pulses either from the clock pulse generator 5 of FIG. 1 or from the synchronisation extractor 12 of FIG. 2. There is provided a normal output A, and an inverted output $\overline{A}$ from the first stage of the shift register 36, and a normal output B and an inverted output $\overline{B}$ from the second stage of the shift register 36. The outputs A and $\overline{B}$ are connected to inputs of an and-gate 37, while the inputs $\overline{A}$ and B are connected to inputs of an and-gate 38. The outputs of the and-gates 37 and 38 are connected, through an or-gate 39, either to the integrating circuit 11 of FIG. 1 or to the integrating circuit 11′ of FIG. 2.

In operation the shift register 36 will hold a sample of two consecutive digit-signals of the signal to be transmitted and received. If these two digit-signals are different in polarity, one or the other of the and-gates 37 and 38 will send an output signal through the or-gate 39 to the integrating circuit 11 or 11′. Thus one increment of electric charge will be added to the charge on the capacitor of the integrating circuit whenever there is a voltage reversal between the two consecutive digit-signals currently held in the shift register 36. The charge on the capacitor leaks away gradually and continuously through the circuit of the modulator 10 or 10' to which it is connected. The voltage across the capacitor forms a control signal dependent on the average rate of application of the increments of charge and therefore on the average rate of occurrence of voltage reversals in the binary signal. The integrating circuits 11 of FIG. 1 and 11' of FIG. 2 have similar time constants which are preferably identical and of the order of 0.5 millisecond. This is about the average duration of a speech sound or phoneme; it allows the control signal to follow variations in amplitude among consecutive speech sounds but avoids sudden drastic changes. The shift register 36 may also replace and perform the function of the trigger circuit 3 and the bistable circuit 4 in the transmitter of FIG. 1.

I claim:

1. A delta-modulation telecommunications system comprising, at a transmitter station,
a source of periodic timing signals,
voltage-responsive means having a synchronizing input connected to said source, and also having a signal input and feedback input, for producing binary-digit-signals in synchronism with said periodic timing signals, each of the said binary-digit-signals indicating whether a signal voltage applied to said signal input is instantaneously greater than or less than a voltage developed on said feedback input,
storage means connected to said voltage-responsive means for temporarily storing a sample of at least two consecutive ones of the said binary-digit-signals,
gate-circuit means connected to said storage means, and comprising at least two and-gates, for producing an output signal in response to each occurrence of a pair of consecutive complementary signals among the said binary-digit-signals,
integrating means connected to said gate-circuit means for integrating the output signals thereof to form a control voltage signal,
feedback-signal modulating means having a signal input connected to receive said binary-digit-signals and having a control input connected to said integrating means, for deriving pulses from said binary-digit signals, said pulses having energy dependent on the instantaneous value of the said control voltage signal and inversely related to the frequency of the signal-changes in the binary-digit signals, and
feedback-signal integrating means having an input connected to receive the said pulses from the said feedback signal modulating means and having an output connected to the said feedback input of the voltage-responsive means.

2. A system as claimed in claim 1 and wherein the said feedback-signal-modulating means comprises a ramp signal generator means for producing a ramp signal, summation means connected to the said integrating means and to the ramp signal generator means for summing the said control voltage signal and the said ramp signal and having a threshold effect for producing pulses whose durations correspond to the periods of time during which the sum of the said ramp signal and the said control voltage signal forms a voltage greater than a predetermined voltage, and at least one gate circuit connected to the signal input of the feedback-signal modulating means and controlled by the said pulses produced by the summation means.

3. A system as claimed in claim 2 and also comprising a further gate circuit having an input connected to receive said binary-digit-signals, and adjustable means connected to the said further gate circuit and the said at least one gate circuit for combining their outputs in selectable relative proportions.

4. A delta-modulation telecommunications system comprising, at a transmitter station,
a source of periodic timing signals,
voltage-responsive means having a synchronizing input connected to said source, and also having a signal input and a feedback input, for producing binary digit signals in synchronism with said periodic timing signals, each of the said binary digit-signals indicating whether a signal voltage applied to said signal input is instantaneously greater than or less than a voltage developed on said feedback input,
reversal-detector means connected to receive said binary-digit-signals from said voltage-responsive means, for deriving a control voltage dependent on the frequency of signal-changes among said binary-digit-signals,
an electrically-controllable pulse generator means connected to the said reversal-detector means for generating pulses at a rate dependent on the said control voltage,
gate-circuit means connected to receive said binary-digit signals and connected to receive said pulses from said electrically-controllable pulse generator means, for deriving a sequence of pulses from each of said binary-digit signals so that the total energy of each sequence of pulses depends on the instantaneous value of said control voltage and is inversely related to the frequency of signal-changes among said binary-digit signals, and
integrating means having an input connected to said gate-circuit means and an output connected to the said feedback input of the said voltage-responsive means.

5. A system as claimed in claim 4 and wherein the said electrically-controllable pulse generator means comprises an electrically-controllable ramp signal generator means, connected to the reversal-detector means, for producing ramp signals with a repetition rate controlled by the control voltage, summation means connected to the reversal-detector means and the ramp signal generator means, for summing the said control voltage signal and the said ramp signals and having a threshold effect for producing pulses whose durations correspond to the periods of time during which the sum of the said ramp signal and the said control voltage forms a voltage greater than a predetermined voltage.

6. A system as claimed in claim 4 and also comprising a further gate circuit having an input connected to receive said binary-digit-signals, and adjustable means connected to the said further gate circuit and the said gate circuit means, for combining their outputs in selectable relative proportions.

7. A system as claimed in claim 5 and also comprising a further gate circuit having an input connected to receive said binary-digit-signals, and adjustable means connected to the said further gate circuit and the said gate circuit means, for combining their outputs in selectable relative proportions.

8. A delta-modulation telecommunications system comprising, at a receiver station,
receiver means for receiving binary-digit signals,
storage means connected to said receiver means for temporarily storing two consecutive ones of the received binary-digit signals,
gate-circuit means comprising two and-gates connected to said storage means, for producing an output signal in response to each occurrence of a pair of consecutive complementary signals among the received binary-digit signals,
integrating means connected to said gate-circuit means for integrating the output signals thereof to form a control voltage signal,
signal-modulating means having a signal input connected to the said receiver means and having a control input connected to receive said control voltage signal from said integrating means, for deriving pulses from said received binary-digit signals, said pulses having energy dependent on the instantaneous value of said control voltage signal and inversely related to the frequency of the signal-changes in the binary-digit signals, and signal-integrating means connected to receive said pulses from said signal-modulating means.

9. A system as claimed in claim 8 and wherein the said signal-modulating means comprises a ramp signal generator means for producing a ramp signal, summation means connected to the said integrating means and to the ramp signal generator means for summing the said control voltage signal and the said ramp signal and having a threshold effect, for producing pulses whose durations correspond to the periods of time during which the sum of the said ramp signal and the said control voltage forms a voltage greater than a predetermined voltage, and at least one gate circuit connected in the path of the received signals and controlled by the said pulses produced by the summation means.

10. A delta-modulation telecommunications system comprising, at a receiver station, receiver means for receiving binary-digit signals, reversal-detector means connected to said receiver means for deriving a control voltage dependent on the frequency of signal-changes among said binary-digit signals, an electrically-controllable pulse generator means connected to the said reversal-detector means for generating pulses at a rate dependent on the said control voltage gate-circuit means connected to receive said binary-digit signals and connected to receive said pulses from said electrically-controllable pulse generator means, for deriving a sequence of pulses from each of said binary-digit signals so that the total energy of each sequence of pulses depends on the instantaneous value of said control voltage and is inversely related to the frequency of signal-changes among said binary-digit signals, and integrating means connected to said gate-circuit means, for integrating the energy of the sequence of pulses therein derived.

11. A system as claimed in claim 10 and wherein the said electrically-controllable pulse-generator means comprises an electrically-controllable ramp signal generator means connected to the reversal-detector means, for producing ramp signals with a repetition rate controlled by the control voltage, summation means connected to the said reversal-detector means and the said ramp signal generator means for summing the said control signal and the said ramp signals and having a threshold effect, for producing pulses whose durations correspond to the periods of the time during which the sum of the said ramp signal and the said control voltage forms a voltage greater than a predetermined voltage.

References Cited

UNITED STATES PATENTS

| | | | |
|---|---|---|---|
| 2,724,740 | 11/1955 | Cutler. | |
| 2,816,267 | 12/1957 | De Jager et al. | 332—11 |
| 3,249,870 | 5/1966 | Greefkes | 325—38 |

ROBERT L. GRIFFIN, Primary Examiner

B. V. SAFOUREK, Assistant Examiner

U.S. Cl. X.R.

179—15.55; 332—11